(12) United States Patent
Nagasawa et al.

(10) Patent No.: US 12,123,851 B2
(45) Date of Patent: Oct. 22, 2024

(54) LOAD MEASURING DEVICE AND LOAD MEASURING METHOD

(71) Applicant: NHK SPRING CO., LTD., Yokohama (JP)

(72) Inventors: Kaoru Nagasawa, Yokohama (JP); Kotaro Nukui, Yokohama (JP); Suguru Shigeno, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 1019 days.

(21) Appl. No.: 17/040,365

(22) PCT Filed: Mar. 14, 2019

(86) PCT No.: PCT/JP2019/010691
§ 371 (c)(1),
(2) Date: Sep. 22, 2020

(87) PCT Pub. No.: WO2019/188373
PCT Pub. Date: Oct. 3, 2019

(65) Prior Publication Data
US 2021/0055193 A1 Feb. 25, 2021

(30) Foreign Application Priority Data

Mar. 30, 2018 (JP) .................. 2018-068374

(51) Int. Cl.
*G01N 3/12* (2006.01)
*G01B 21/04* (2006.01)
*G01L 5/00* (2006.01)

(52) U.S. Cl.
CPC ............. *G01N 3/12* (2013.01); *G01B 21/042* (2013.01); *G01L 5/0033* (2013.01)

(58) Field of Classification Search
CPC ................................ G01N 3/12; G01B 21/042
(Continued)

(56) References Cited

U.S. PATENT DOCUMENTS 5,090,249 A * 2/1992 Bielewicz ................ G01N 3/08
73/822
5,092,179 A * 3/1992 Ferguson ................. G01N 3/18
73/790

(Continued)

FOREIGN PATENT DOCUMENTS

CN 203053804 U * 7/2013
CN 105136576 A * 12/2015
(Continued)

*Primary Examiner* — Andre J Allen
(74) *Attorney, Agent, or Firm* — Norris McLaughlin, P.A.

(57) ABSTRACT

Provided is a load measuring device and a load measuring method, capable of preventing a measuring error caused by an initial load in a state where an elastic member is held by a pair of holding parts when a load of the elastic member at the time of stretching is measured. A pair of holding parts 5, 7 are caused to approach or space away with respect to each other relatively to an initial position at which the pair of the holding parts hold a close contact spring S, thereby making an initial load measured at the initial position zero, the pair of holding parts 5, 7 are caused to space away with respect to each other from a starting position being a position at which the initial load becomes zero, and a load at a time of stretching is caused to be measured.

8 Claims, 3 Drawing Sheets

(58) Field of Classification Search
USPC .......................................................... 73/788
See application file for complete search history.

(56) References Cited

U.S. PATENT DOCUMENTS

| | | | | |
|---|---|---|---|---|
| 5,515,294 | A * | 5/1996 | Mohr | G01N 3/00 |
| | | | | 73/826 |
| 7,770,467 | B1 * | 8/2010 | Halderman | G01N 3/04 |
| | | | | 73/849 |
| 7,784,355 | B2 * | 8/2010 | Kawano | G01N 3/32 |
| | | | | 73/788 |
| 9,063,035 | B2 * | 6/2015 | Kismarton | G01N 3/04 |
| 9,500,574 | B2 * | 11/2016 | Liu | G01N 3/04 |
| 9,726,657 | B2 * | 8/2017 | Saleem | G01N 3/08 |
| 10,928,281 | B2 * | 2/2021 | Iwakiri | G01N 3/08 |
| 2013/0327152 | A1 * | 12/2013 | Chen | G01N 3/08 |
| | | | | 73/818 |
| 2016/0101491 | A1 * | 4/2016 | Vincent | G06K 1/121 |
| | | | | 29/721 |
| 2020/0124510 | A1 * | 4/2020 | Ma | G01N 3/32 |
| 2021/0259403 | A1 * | 8/2021 | Swetharanyam | A47B 9/20 |

FOREIGN PATENT DOCUMENTS

| | | |
|---|---|---|
| JP | 59-131034 U | 9/1954 |
| JP | 57-38820 B | 8/1982 |
| JP | 57-159136 U | 10/1982 |
| JP | 2006-090967 A | 4/2006 |

* cited by examiner

LOAD MEASURING DEVICE AND LOAD MEASURING METHOD

FIELD OF THE INVENTION

The present invention relates to a load measuring device and a load measuring method to measure a load when stretching an elastic member such as a spring.

BACKGROUND OF THE INVENTION

When characteristics of a tension spring is examined for example, both ends of the tension spring are pulled and a load is measured at the time of stretching.

In a case of a general tension spring, hooks are provided at both ends similar to Patent document 1 and the like, so that stretching is performed using the hooks to allow measurement of a load to be easily performed.

In contrast, in cases of special tension springs and close contact springs (close contact spring etc.) for use other than the tension spring, they may have no hooks on both ends and measurement of a load may not be performed similar to the general tension spring. Although there is no conventional device to measure a load of the close contact spring etc., a pair of holding parts such as chucks hold both ends of the close contact spring etc. to allow a load to be measured similarly to tensile testing for example.

In the close contact spring etc., however, an outer diameter is not frequently strictly constant from one end to the other end due to a manufacturing error and the like. Accordingly, the close contact spring etc. may have a natural posture inclining relatively to an axis between the holding parts in a state where one holding part holds the one end.

In this case, the close contact spring etc. bends when the both ends thereof are held by the holding parts, so that an initial load acts on the holding parts. Accordingly, there is a problem that an error is caused on the measurement of the load.

Such a problem is widely caused when measuring a load of an elastic member, not only the close contact spring etc.

PATENT DOCUMENT 1: JP S57-38820 B

SUMMARY OF THE INVENTION

A problem to be solved is that, when a load of an elastic member at the time of stretching is measured, a measurement error is caused by an initial load in a state where the elastic member is held by a pair of holding parts.

The present invention, in order to prevent a measuring error caused by an initial load in a state where an elastic member is held by a pair of holding parts when a load of the elastic member at the time of stretching is measured, is characterized by a load measuring device to measure the load of the elastic member, comprising a pair of holding parts that hold the elastic member, a driving part that drives the pair of the holding parts so as to approach or space away with respect to each other, a load measuring part that measures a load acting on the pair of the holding parts while holding the elastic member, a controlling part that controls the driving part and obtains the load from the load measuring part, wherein the controlling part causes the pair of the holding parts to approach or space away with respect to each other relatively to an initial position at which the pair of the holding parts hold the elastic member, thereby making an initial load measured at the initial position zero, and causes the pair of the holding parts to space away with respect to each other from a starting position being a position at which the initial load becomes zero, and causes the load at a time of stretching to be measured.

Further, the present invention is characterized by a load measuring method to measure a load of an elastic member, comprising holding the elastic member with a pair of holding parts, measuring a load acting on the pair of the holding parts from a state where the elastic member is held, causing the pair of the holding parts to approach or space away with respect to each other relatively to an initial position at which the pair of the holding parts hold the elastic member, thereby making an initial load measured at the initial position zero, causing the pair of the holding parts to space away with respect to each other from a starting position being a position at which the initial load becomes zero, and measuring the load at a time of stretching.

Since the load measuring device and method according to the present invention sets the initial load acting at the time of holding the elastic member with the pair of the holding parts to zero when the load of the elastic member at the time of stretching is measured, they prevent a measuring error caused by the initial load.

BRIEF DESCRIPTION OF THE DRAWINGS

FIGS. 3(A) and (B) are graphs showing relations of a plurality of close contact springs between the load and the displacement in which FIG. 3(A) shows of a comparative example and FIG. 3 (B) shows of an embodiment.

EMBODIMENT FOR CARRYING OUT THE INVENTION

The present invention accomplishes the object that a measuring error, which is caused by an initial load in a state where an elastic member is held by a pair of holding parts when a load of the elastic member at the time of stretching is measured, is prevented by a load measuring device and a load measuring method causing the pair of the holding parts to approach or space away with respect to each other relatively to an initial position at which the pair of the holding parts hold the elastic member, thereby making the initial load measured at the initial position zero, and causing the pair of the holding parts to space away with respect to each other from a starting position being a position at which the initial load becomes zero, and measuring a load at a time of stretching.

The load measuring apparatus and method may repeatedly cause the pair of the holding parts to approach and space away with respect to each other, thereby causing the pair of the holding parts approach or space away with respect to each other to the starting position.

The load may be measured relatively to a displacement in micrometric units, and each approaching or spacing-away at the time of the repeatedly approaching and spacing-away may be a fine motion in micrometric units. The elastic member may be a close contact spring, and the load measuring device and method may measure an initial tension through the load measuring. In this case, a displacement amount, which is based on the approaching or the spacing-away of the pair of the holding parts with respect to each other relatively to the initial position, may be set to zero at the starting position, a relation between the measured load and a displacement which is based on the spacing-away of the pair of the holding parts with respect to each other from the starting position may be obtained, a linear function f(x)=ax+b of a linear region, in which increase of the load to increase of the displacement in the relation is deemed as constant, may be found, and an intercept b of the found linear function f(x)=ax+b may be determined as an initial tension of the close contact spring.

Figure 1:
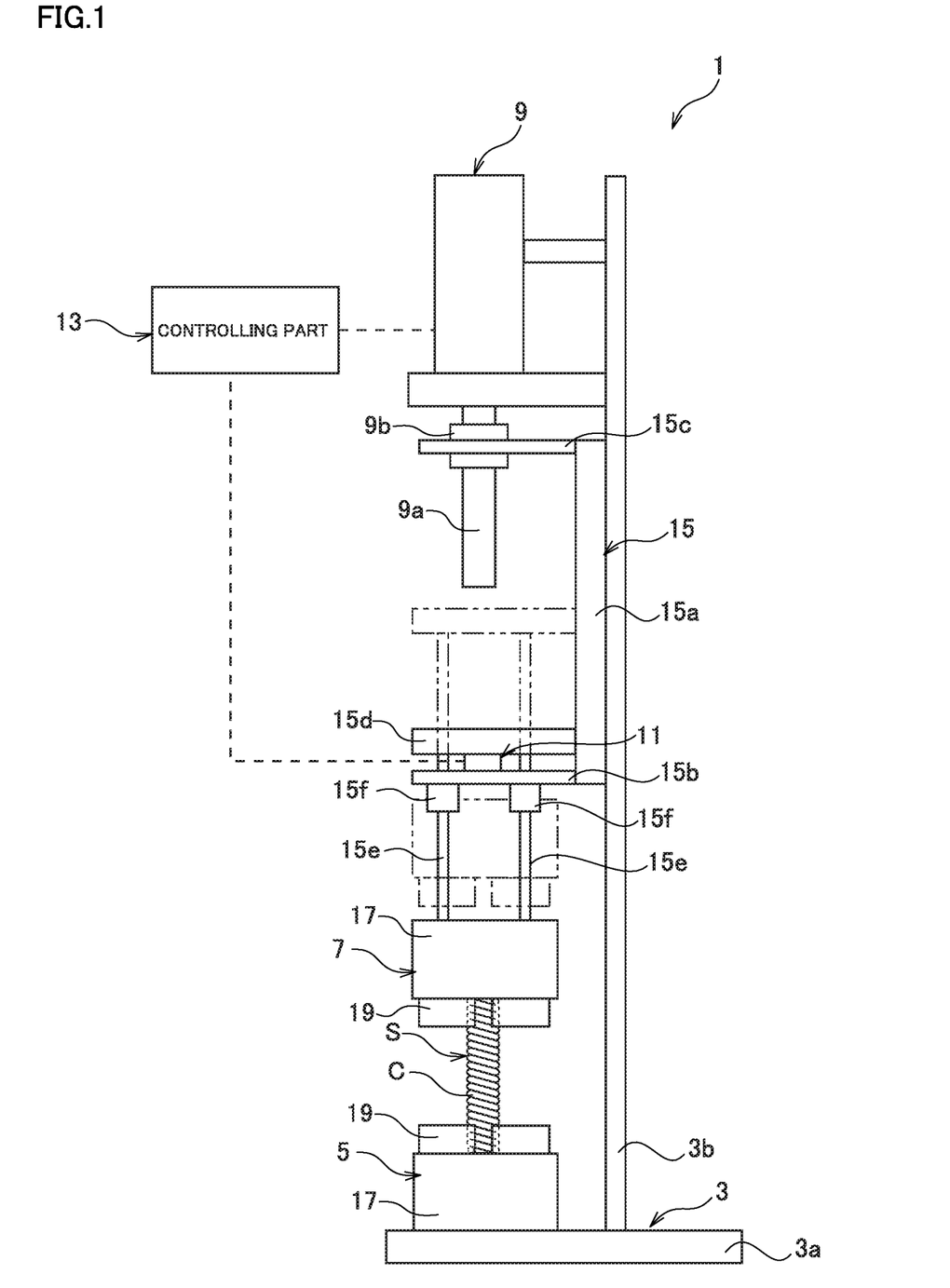
FIG. 1 is a schematic view of a load measuring device according to an embodiment.

FIG. 1 is a schematic view illustrating a load measuring device according to the embodiment of the present invention.

The load measuring device 1 is provided with a device base 3, a pair of holding parts 5, 7, a driving part 9, a load measuring part 11, and a controlling part 13, and causes the pair of the holding parts 5, 7 holding a close contact spring S as an elastic member to space away with respect to each other and measures a load at the time of stretching caused thereby.

Further, the load measuring device 1 of the present embodiment measures an initial tension of the close contact spring S through the measuring of the load of the close contact spring S. The initial tension, in the close contact spring S in which axially adjacent coil portions C are in contact with each other, is stress acting between the adjacent coil portions C in a contact direction. It should be noted that the elastic member is not limited to the close contact spring S, and may be a tension spring partially being a close contact spring, or other elastic members.

The device base 3 is configured by providing a pole part 3b so as to protruding from a plate part 3a arranged on an installation place along a vertical direction. To the device base 3, the pair of the holding parts 5, 7, the driving part 9, and the load measuring part 11 are provided.

The pair of the holding parts 5, 7 are to hold both ends of the close contact spring S, respectively. The pair of the holding parts 5, 7 is configured to be allowed to approach and space away with respect to each other and stretch the close contact spring according to the approaching and the spacing-away. According to the present embodiment, a direction of the approaching and the spacing-away is the vertical direction and may be a horizontal direction or the like instead.

The first holding part 5 is fixed on the plate part 3a of the device base 3, and the second holding part 7 is movably supported with the pole part 3b of the device base 3 through a movable part 15. With this, the second holding part 7 is configured to approach and space away with respect to the first holding part 5. It should be noted that both the holding parts 5, 7 may be configured to be linked to approach and space away in a case where the approaching and the spacing-away are performed in the horizontal direction or the like.

Each of the holding parts 5, 7 is configured by a chuck, in particular a three-claw chuck, to hold the close contact spring S at an end from an outer periphery. It should be noted that the holding parts 5, 7 are not limited to the three-claw chucks and may be other chucks or holding devices other than the chucks as long as the close contact spring S is directly held.

The holding parts 5, 7 being the three-claw chucks each support three claw parts 19 diametrally movably with a cylindrical chuck base 17. The holding parts 5, 7 bring all the claw parts 19 into contact with the outer periphery of the close contact spring S, thereby to hold the close contact spring S from the outer periphery.

The chuck base 17 of one holding part 5 is fixed on the plate part 3a of the device base 3. The chuck 17 of the other holding part 7 is supported with the movable part 15.

The movable part 15 is composed of a movable base 15a, a first and a second fixed pieces 15b, 15c, a movable piece 15d, and arm parts 15e.

The movable base 15a is a member movably supported with the pole part 3b of the device base 3, and is formed of a plate body movably engaging with the pole part 3b on a back face for example. On a front face of the movable base 15a, the first and the second fixed pieces 15b, 15c are provided.

The first and the second fixed pieces 15b, 15c are members fixed to the front face of the movable base 15a in a state protruding in the horizontal direction. The first and the second fixed pieces 15b, 15c of the present embodiment are plate bodies fixed to an upper and a lower end of the movable base 15a and face each other in the vertical direction.

On an upper face of the first fixed piece 15b, the load measuring part 11 is supported. Further, the first fixed piece 15b is provided with guide parts 15f through which the arm parts 15e of the movable part 15 are slidably passed. The second fixed piece 15c is connected to the driving part 9 and is vertically driven by the driving part 9.

The movable piece 15d is movably supported to the movable base 15a between the first and the second fixed pieces 15b, 15c. On a lower face of the movable piece 15d, a plurality of the arm parts 15e are provided integrally.

The arm parts 15e are extended downward from the lower face of the movable piece 15d and are passed through the guide parts 15f of the first fixed piece 15b to be protruded downward. To tip ends of the arm parts 15e, the chuck base 17 of the second holding part 7 is attached.

The movable part 15, therefore, is configured to support the second holding part 7 by the movable piece 15d through the arm parts 15e and receive the movable piece 15d by the first fixed piece 15b with interposition of the load measuring part 11.

The driving part 9 is to drive the pair of the holding parts 5, 7 so as to approach and space away with respect to each other and is, for example, a servo motor. The driving part 9 is electrically connected to the controlling part 13 to be controlled.

The driving part 9 is fixed to an upper end of the pole part 3b of the device base 3. From the driving part 9, a rotary shaft 9a is protruded downward. The rotary shaft 9a is connected to the second fixed piece 15c of the movable part 15 through an axially driving mechanism 9b such as a ball screw.

The driving part 9, therefore, is configured to output driving force through the rotary shaft 9a to vertically move the second fixed piece 15c i.e. the movable part 15 through the axially driving mechanism 9b. With this vertical movement, the second holding part 7 is vertically moved.

The load measuring part 11 is to allow a load acting on the pair of the holding parts 5, 7 to be measured while holding the close contact spring S. The load measuring part 11 of the present embodiment is configured by a load cell or the like and measures the load input through the movable piece 15d of the movable part 15 on the first fixed piece 15b of the movable part 15. The load measuring part 11 is electrically connected to the controlling part 13 and outputs the measured load to the controlling part 13.

The controlling part 13 comprises an information processing device that controls the driving part 9 and obtains the load from the load measuring part 11.

The controlling part 13 causes the pair of the holding parts 5, 7 to approach or space away with respect to each other by control of the driving part 9. According to the present embodiment, the second holding part 7 is caused to approach or space away with respect to the first holding part 5.

At this time, the controlling part 13 functions as a displacement measuring part to electrically measure a displacement amount that is based on the approaching or the spacing-away of the pair of the holding parts 5, 7 with respect to each other. The displacement measuring part may be, however, configured by separately providing a displacement meter connected to the controlling part 13. Further, the controlling part 13 may electrically obtain the load through the control of the driving part 9. In this case, the controlling part 13 also functions as the load measuring part.

The controlling part 13 causes the pair of the holding parts 5, 7 to approach or space away with respect to each other relatively to an initial position at which the pair of the holding parts hold the close contact spring S, thereby making an initial load measured at the initial position zero, and causes the pair of the holding parts 5, 7 to space away with respect to each other from a starting position being a position at which the initial load becomes zero, and causes the load at the time of stretching to be measured.

Further, the controlling part 13 of the present embodiment repeatedly causes the pair of the holding parts 5, 7 to approach and space away with respect to each other, thereby causing the pair of the holding parts 5, 7 to approach or space away with respect to each other to the starting position. When repeating the approaching and the spacing-away, the next approaching or the next spacing-away is performed according to the amount of change in the load which is based on the immediately preceding approaching or the immediately preceding spacing-away.

Further, the controlling part 13 of the present embodiment finds the initial tension of the close contact spring S through the measuring of the load at the time of the stretching. For this, the controlling part 13 sets the displacement amount (the displacement amount from the initial position up to the starting position) that is based on the approaching or the spacing-away of the pair of the holding parts 5, 7 with respect to each other relatively to the initial position to zero at the starting position.

Then, the controlling part 13 obtains a relation between the measured load and the displacement amount that is based on the spacing-away of the pair of the holding parts 5, 7 with respect to each other from the starting position and finds the initial tension of the close contact spring S based on the obtained relation.

Figure 2:
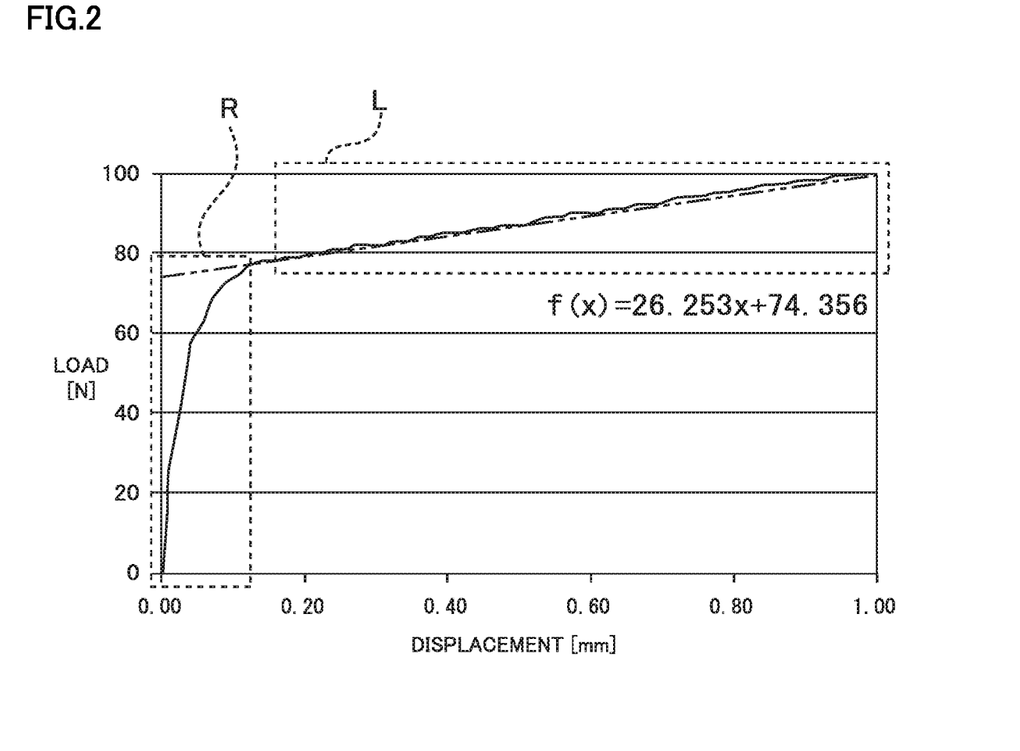
FIG. 2 is a graph illustrating a relation between a load and a displacement of a close contact spring according to the embodiment.

FIG. 2 is a graph illustrating an example of the relation between the load and the displacement amount of the close contact spring.

In the close contact spring S, as illustrated in FIG. 2, a load-displacement curve is obtained as the relation between the load and the displacement amount. In the load-displacement curve, a rising region R in which an increase amount in the load relative to increase of the displacement amount is large due to the initial tension is appeared at the beginning of the stretching, and the increase amount in the load relative to the increase of the displacement amount becomes gradually small around the load excessing the initial tension. Then, a linear region L is appeared, the linear region in which the increase amount in the load relative to the increase of the displacement amount is deemed as constant.

According to the present embodiment, a linear function $f(x)=ax+b$ of the linear region L is found, and the intercept b of the found linear function $f(x)$ is determined as an initial tension of the close contact spring. In addition, the slope a of the linear function $f(x)$ is a spring constant. In the example of FIG. 2, a is 26.253, b is 76.356(N).

In the present embodiment, an example of the load measuring method using the load measuring device 1 will be explained as well as operation of the load measuring device 1. The load measuring method may be, however, realized by other devices and the like enabling a load to be measured while spacing away the pair of the holding parts 5, 7 holding the close contact spring S without using the load measuring device 1.

According to the load measuring method of the present embodiment, a worker causes the pair of the holding pats 5, 7 of the load measuring device 1 to hold both ends of the close contact spring S. At the time of the holding, the second holding part 7 is vertically moved to be arranged at the initial position, thereby to butt end faces of the close contact spring S against the chuck bases 17 of the holding parts 5, 7. In this state, each claw part 19 of the holding parts 5, 7 is brought into contact with the outer periphery of the close contact spring S.

Holding the close contact spring S in this way, the load is measured by the load measuring part 11 from then on. At the initial position immediately after the holding, although the load is expected to be zero, in the close contact spring S, the close contact spring S may bend according to inclination as mentioned above to act the initial load on the holding parts 5, 7.

The initial load affects the load at the time of the stretching of the close contact spring S. In particular, as illustrated in FIG. 2, in the case of measuring the load with respect to the fine displacement in micrometric units, a slight inclination in micrometric units greatly affects the load at the time of the stretching.

Then, the load measuring method of the present embodiment sets this initial load to zero before measuring the load. Namely, the controlling part 13 determines whether a load excessing zero is measured at the initial position at which the pair of the holding parts 5, 7 hold the close contact spring S.

If it is measured, the controlling part 13 controls the driving part 9 to cause the pair of the holding parts 5, 7 to approach or space away with respect to each other relatively to the initial position until the initial load becomes zero. At this time, since it is hard to make the initial load zero by one approaching or spacing-away, the approaching and the spacing-away are repeated.

In particular, the pair of the holding parts 5, 7 are caused to approach or space away with respect to each other based on the initial load first, and a displacement amount and an increase amount of the load are measured at that time. Then, the pair of the holding parts 5, 7 are caused to additionally approach or space away with respect to each other based on the measured displacement amount and the measured increase amount of the load. This is repeated until the initial load becomes zero.

Accordingly, the next approaching or spacing-away is performed according to the amount of change in the load which is based on the immediately preceding approaching or spacing-away. It should be noted that the load is measured relatively to the fine displacement in micrometric units, so that each approaching or spacing-away at the time of the repeatedly approaching and spacing-away is a fine motion in micrometric units. The size of each approaching or spacing-away may be, however, appropriately altered according to a relation between a load of an object to be measured and a displacement amount.

After making the initial load zero, the controlling part 13 sets the displacement amount that is based on the approaching or the spacing-away of the pair of the holding parts 5, 7 with respect to each other relatively to the initial position to zero. This is triggered by that the load becomes zero.

Setting the position at which the initial load and the displacement amount are zero the starting position, the controlling part 13 causes the pair of the holding parts 5, 7 to space away with respect to each other and measures the load at the time of the stretching. At this time, the displacement amount is also measured as well as the load.

In this way, the load-displacement curve is obtained from the measured load and the measured displacement amount. Based on the obtained load-displacement curve, the controlling part 13 finds the linear function f(x)=ax+b of the linear region L in which the increase of the load to the increase of the displacement amount is deemed as constant, and determines the intercept b of the found linear function f(x) as the initial tension of the close contact spring S.

This is because the load-displacement curve of the close contact spring S is theoretically expressed by the linear function with the intercept being the initial tension, so that the intercept b of the linear function f(x) found from the linear region L in the load-displacement curve obtained from the close contact spring S is deemed as the initial tension.

It should be noted that the end point of the linear region L is apparently in the linear region L and the start point is, therefore, searched to determine the linear region. The searching of the start point may be carried out by an appropriate calculating method based on the slope and the like of the load-displacement curve. For example, the start point may be determined as a point or the like at which a reduction amount when the slope of the load-displacement curve is gradually reduced is equal to or less than a threshold value. The linear function f(x) may be found by an appropriate calculating method such as regression analysis.

In this way, the load measuring method of the present embodiment allows the initial tension to be accurately measured through the accurately measuring of the load of the close contact spring S.

It should be noted that the accurately measuring of the load and the initial tension of the close contact spring S is also caused by shortening the sampling period. Although shortening the sampling period improves the measuring accuracy of the load of the close contact spring S, the rising region R of the load-displacement curve hindering the measuring of the initial tension is measured at the beginning of the stretching of the close contact spring S.

Even if the sampling period measuring the rising region R of the load-displacement curve is employed, the load measuring method of the present embodiment accurately measures the initial tension as mentioned above.

Figure 3A:
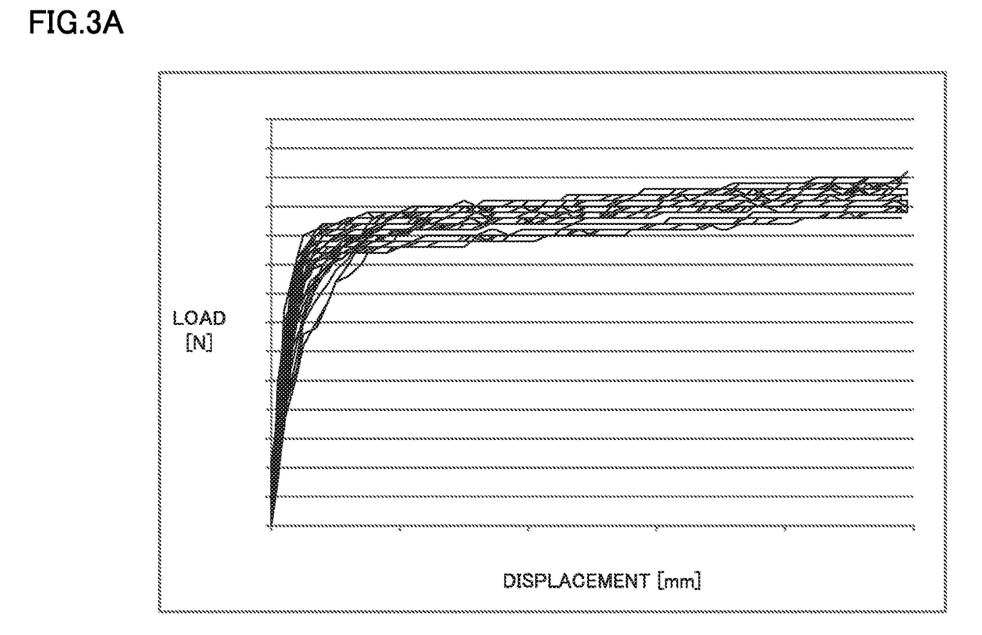
Figure 3B:
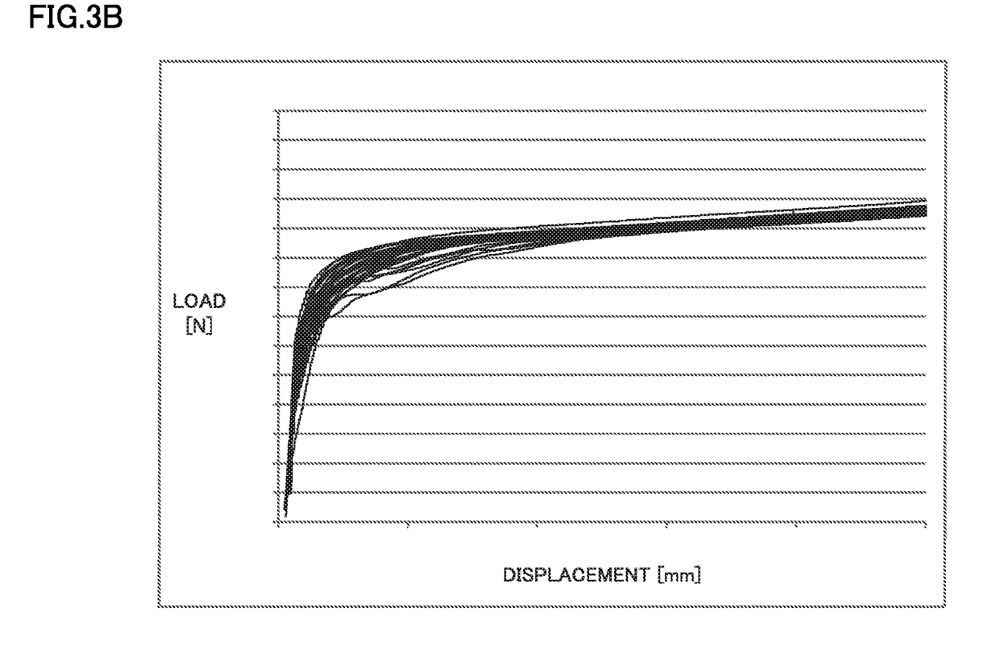

FIG. 3 is a set of graphs illustrating relations (load-displacement curves) of a plurality of close contact springs between a load and a displacement in which (A) shows of a comparative example and (B) shows of the embodiment. In addition, the close contact springs of FIG. 3 are different from the close contact spring of FIG. 2 in initial tension.

The comparative example and the embodiment illustrate the load-displacement curves obtained from the plurality (30 pieces) of close contact springs together. The comparative example performed measuring without setting initial loads to zero, and the embodiment performed measuring with setting initial loads to zero as mentioned above.

In the comparative example, variation in the load was large according to influence of the initial loads and variation in the measured initial tension was also large consequently.

On the other hand, since the initial load is set to zero in the embodiment, variation in the load was small and variation in the measured initial tension was also small.

At this result, the measuring accuracy of the initial tension in the embodiment is about three times as in the comparative example in FIG. 3.

The load measuring device 1 of the present embodiment is provided with the pair of the holding parts 5, 7 that hold the close contact spring S, the driving part 9 that drives the pair of the holding parts 5, 7 so as to approach or space away with respect to each other, the load measuring part 11 that measures the load acting on the pair of the holding parts 5, 7 while holding the close contact spring S, and the controlling part 13 that controls the driving part 9 and obtains the load from the load measuring part 11. The controlling part 13 causes the pair of the holding parts 5, 7 to approach or space away with respect to each other relatively to the initial position at which the pair of the holding parts 5, 7 hold the close contact spring S, thereby making the initial load measured at the initial position zero, and causes the pair of the holding parts 5, 7 to space away with respect to each other from the starting position being the position at which the initial load becomes zero, and causes the load at the time of stretching to be measured.

Since the initial load acting when the close contact spring S is held with the pair of the holding parts 5, 7 is, therefore, set to zero, the present embodiment prevents the measuring error caused by the initial load. Accordingly, the present embodiment accurately measures the load of the close contact spring S.

The controlling part 13 repeatedly causes the pair of the holding parts 5, 7 to approach and space away with respect to each other, thereby causing the pair of the holding parts 5, 7 to approach or space away with respect to each other to the starting position. The initial load is, therefore, easily and surely made zero.

In the present embodiment, the load is measured relatively to the displacement in micrometric units, and each approaching or spacing-away at the time of the repeatedly approaching and spacing-away is the fine motion in micrometric units. Accordingly, in a case where slight inclination of the close contact spring in micrometric units largely affects the measuring of the load, the initial load is surely made zero to realize the accurately measuring of the load at the time of the stretching.

Further, the controlling part 13 sets the displacement amount that is based on the approaching or the spacing-away of the pair of the holding parts 5, 7 with respect to each other relatively to the initial position to zero at the starting position, obtains the relation between the measured load and the displacement amount that is based on the spacing-away of the pair of the holding parts 5, 7 with respect to each other from the starting position, finds the linear function f(x)=ax+b of the linear region L in which the increase of the load to the increase of the displacement amount in the relation is deemed as constant, and determines the intercept b of the found linear function f(x) as the initial tension of the close contact spring S.

The present embodiment, therefore, allows the initial tension to be accurately measured through the accurately measuring of the load of the close contact spring S.

The load measuring method of the present embodiment is the load measuring method to measure the load of the close contact spring S, which holds the close contact spring S with the pair of the holding parts, measures the load acting on the pair of the holding parts 5, 7 from the state where the close contact spring S is held, causes the pair of the holding parts 5, 7 to approach or space away with respect to each other relatively to the initial position at which the pair of the holding parts hold the close contact spring S, thereby making the initial load measured at the initial position zero, causes the pair of the holding parts 5, 7 to space away with respect to each other from the starting position being the position at which the initial load becomes zero, and measures the load at the time of the stretching.

Further, the load measuring method repeatedly causes the pair of the holding parts 5, 7 to approach and space away with respect to each other, thereby causing the pair of the holding parts 5, 7 to approach or space away with respect to each other to the starting position.

According to the present embodiment, the load is measured relatively to the displacement in micrometric units, and each approaching or spacing-away at the time of the repeatedly approaching and spacing-away is the fine motion in micrometric units.

Further, the load measuring method sets the displacement amount that is based on the approaching or the spacing-away of the pair of the holding parts 5, 7 with respect to each other relatively to the initial position to zero at the starting position, obtains as the relation between the measured load and the displacement amount that is based on the spacing-away of the pair of the holding parts 5, 7 with respect to each other from the starting position, and finds the linear function f(x)=ax+b of the linear region L in which the increase of the load to the increase of the displacement amount in the relation is deemed as constant and determines the intercept b of the found linear function f(x) as the initial tension of the close contact spring.

The load measuring method of the present embodiment, therefore, provides the same effects as the load measuring device.

The invention claimed is:

1. A load measuring device to measure a load of a coil spring, comprising:
   a pair of holding parts that hold the coil spring at ends of the coil spring form outer peripheries of the ends, respectively;
   a driving part that drives the pair of the holding parts so as to approach and space away with respect to each other;
   a load measuring part that measures a load acting on the pair of the holding parts holding the coil spring at the ends from the outer peripheries of the ends, the load including an initial load caused by the coil spring bent according to inclination of the coil spring relative to an axis between the holding parts and acting on the holding parts at an initial position performing the holding of the ends of the coil spring;
   a controlling part that controls the driving part and obtains the load from the load measuring part, wherein
   the controlling part causes the pair of the holding parts to approach or space away with respect to each other relatively to the initial position at which the pair of the holding parts hold the coil spring, thereby making the initial load being measured by the lead measuring part zero, and thereafter causes the pair of the holding parts to space away with respect to each other to stretch the coil spring from a starting position being a position at which the initial load being measured by the load measuring part becomes zero, and causes the load measuring part to measure a load at a time of the stretching from the starting position.

2. The load measuring device according to claim 1, wherein
   the controlling part repeatedly causes the pair of the holding parts to approach and space away with respect to each other, thereby causing the pair of the holding parts to approach or space away with respect to each other to the starting position.

3. The load measuring device according to claim 2, wherein
   the load at the time of the stretching is measured relatively to a displacement in micrometric units, and
   each approaching or spacing-away at the time of the repeatedly approaching and spacing-away is a fine motion in micrometric units.

4. A load measuring device to measure a load of an elastic member, comprising:
   a pair of holding parts that hold the elastic member, the elastic member being a close contact spring;
   a driving part that drives the pair of the holding parts so as to approach and space away with respect to each other;
   a load measuring part that measures a load acting on the pair of the holding parts while holding the elastic member;
   a controlling part that controls the driving part and obtains the load from the load measuring part, wherein
   the controlling part causes the pair of the holding parts to approach or space away with respect to each other relatively to an initial position at which the pair of the holding parts hold the elastic member, thereby making an initial load measured at the initial position zero, and causes the pair of the holding parts to space away with respect to each other from a starting position being a position at which the initial load becomes zero, and causes a load at a time of stretching to be measured, and
   the controlling part sets a displacement amount that is based on the approaching or the spacing-away of the pair of the holding parts with respect to each other relatively to the initial position to zero at the starting position, obtains a relation between the measured load and a displacement amount that is based on the spacing-away of the pair of the holding parts with respect to each other from the starting position, finds a linear function f(x)=ax+b of a linear region in which increase of the load to increase of the displacement amount in the relation is deemed as constant, and determines an intercept b of the found linear function f(x) as an initial tension of the close contact spring.

5. A load measuring method to measure a load of a coil spring, comprising:
   holding the coil spring with a pair of holding parts at ends of the coil spring from outer peripheries of the ends, respectively;
   measuring a load acting on the pair of the holding parts holding the coil spring at the ends from the outer peripheries of the ends, the load including an initial load caused by the coil spring bent according to inclination of the coil spring relative to an axis between the holding parts and acting on the holding parts at an initial position performing the holding of the ends of the coil spring;
   causing the pair of the holding parts to approach or space away with respect to each other relatively to the initial position at which the pair of the holding parts hold the coil member, thereby making the initial load being measured zero; and thereafter causing the pair of the holding parts to space away with respect to each other to stretch the coil spring from a starting position being a position at which the initial load being measured by the load measuring part becomes zero and measuring a load at a time of the stretching from the starting position.

6. The load measuring method according to claim 5, wherein repeatedly causing the pair of the holding parts to approach and space away with respect to each other, thereby causing the pair of the holding parts to approach or space away with respect to each other to the starting position.

7. The load measuring method according to claim 6, wherein the load at the time of the stretching is measured relatively to a displacement in micrometric units, and each approaching or spacing-away at the time of the repeatedly approaching and spacing-away is a fine motion in micrometric units.

8. A load measuring method to measure a load of an elastic member, comprising:

holding the elastic member with a pair of holding parts, the elastic member being a close contact spring;

measuring a load acting on the pair of the holding parts from a state where the elastic member is held;

causing the pair of the holding parts to approach or space away with respect to each other relatively to an initial position at which the pair of the holding parts hold the elastic member, thereby making an initial load measured at the initial position zero; and causing the pair of the holding parts to space away with respect to each other from a starting position being a position at which the initial load becomes zero and measuring a load at a time of stretching;

setting a displacement amount that is based on the approaching or the spacing-away of the pair of the holding parts with respect to each other relatively to the initial position to zero at the starting position;

obtaining a relation between the measured load and a displacement amount that is based on the spacing-away of the pair of the holding parts with respect to each other from the starting position;

finding a linear function $f(x)=ax+b$ of a linear region in which increase of the load to increase of the displacement amount in the relation is deemed as constant; and determining an intercept b of the found linear function $f(x)$ as an initial tension of the close contact spring.

* * * * *